WAVE NUMBER CM$^{-1}$ m$\mu$

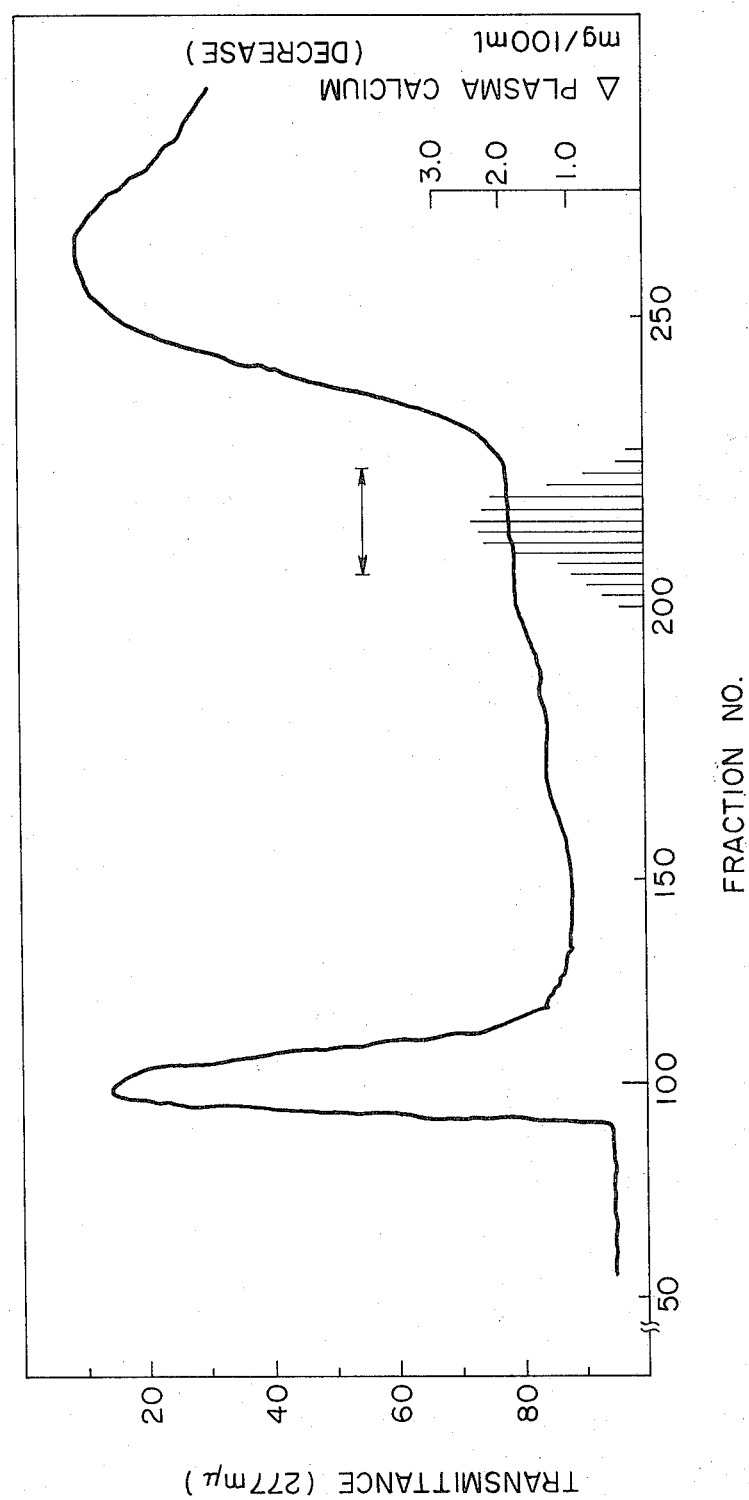

United States Patent Office 3,822,348
Patented July 2, 1974

3,822,348
HORMONE-LIKE SUBSTANCE HAVING SERUM CALCIUM REDUCING PROPERTY
Teizo Higashi, Kanagawa, and Jinnosuke Abe, Teruo Take, Susumu Watanabe, and Masaru Otani, Shizuoka, Japan, assignors to Toyo Jozo Company, Ltd., Shizuoka, Japan
Continuation-in-part of abandoned application Ser. No. 122,834, Mar. 10, 1971. This application July 17, 1972, Ser. No. 272,674
Claims priority, application Japan, Dec. 28, 1970, 46/124,444
Int. Cl. A61k 17/00
U.S. Cl. 424—95                    17 Claims

ABSTRACT OF THE DISCLOSURE

A hormone-like substance of polypeptide type having serum calcium reducing property in mammals, which is isolated from an eel, genus Anguilla, by extracting heart, particularly pericardial membrane and/or a tissure comprising vena cava attached to oesophagus near the heart with an extraction solvent, i.e. water, dilute organic acid, dilute mineral acid or a mixture of water, hydrophilic organic solvent and at least one of the dilute acids, and removing contaminating proteins from the resulting extract or from an extract liquid obtained by removing solids from said extract. The substance is useful for treatment of various metabolic osteological disease, for example, osteopetrosis and gerontological diseases. The eels used are preferably those bred in sea water or an aqueous sodium chloride solution similar in composition thereto.

Figure 1:
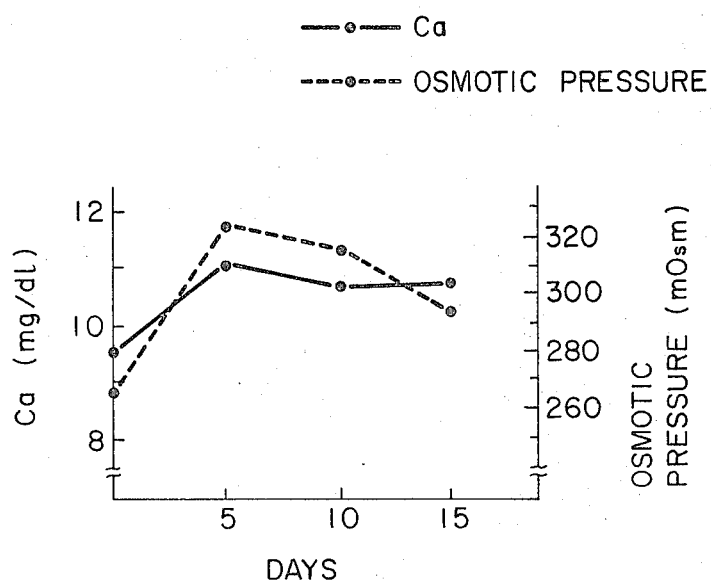

This application is a continuation-in-part application of our prior U.S. Application Ser. No. 122,834, filed Mar. 10, 1971, now abandoned.

This invention relates to a hormone-like substance having serum calcium reducing property in mammals. More particularly, the invention pertains to a hormone-like substance having serum calcium reducing property in mammals, which is isolated by extraction from an endocrine gland of an eel, genus Anguilla, and to a process for the extraction thereof.

It is already known that thyroid and parathyroid glands of mammals play an important role in calcium metabolism. P. F. Hirsch et al. reported in "Endocrinology," 73 244 (1963) that thyrocalcitonin as a mammalian serum calcium reducing hormone had been extracted from rat thyroid gland. There has been confirmed also that thyrocalcitonin is present in thyroid glands of such mammals as dogs, monkeys, hogs and cows, and in humans.

Recently, polypeptide substances analogous to thyrocalcitonin have been found in other organ than thyroid gland, i.e. a tissue called ultimobranchial body, in birds, fishes and amphibiotic animals. These substances are used clinically in the treatment of osteopetrosis and gerontological diseases.

Based on the fact that all the secretory tissues in which these substances are present have proved to be Toluidine blue-positive (they are dyed in reddish purple color), the present inventors found that a Toluidine blue-positive tissue exists in the wall of blood vessel of vena cava running along the oesophagus of eel in the direction of the heart while being attached to the wall of oesophagus. Rats were administrated with an extract of the tissue, whereby reduction in serum calcium value was observed.

Further, the present inventors found that a secretory tissue, in which the same effective substance as above is present, exists in a pericardial membrane of the heart of eel. The existence therein of such secretory tissue, however, has not been confirmed when the quests on the subject has been conducted according to the Toluidine blue dyeing method. So far as known there is no parallel case on record where the existence of secretory tissues, in which such effective substance is present, in the pericardial membrane of the hearts of birds, fishes or amphibiotic animals has been reported. The pericardial membrane is a tissue which is irrelevant to ultimorbanchial body from a genetic point of view.

Serum calcium values and potencies of serum calcium reducing hormone per unit of the secretory tissue of sexually adult eels coming down to sea for spawning and young ones not grown yet to spawning stage, which had been seized in November at the Tone River, were determined to obtain the results as shown in Table 1. It is appreciated from the results obtained that the adult eels are all low, as compared with young ones, in both the value and potency.

TABLE 1

| | Number | Weight (g.) | Serum calcium value (mg./dl.) | Potency (MRC U/ gland) |
|---|---|---|---|---|
| Young eel | 1 | 115 | 13.3 | 4.3 |
| | 2 | 159 | 13.0 | 3.1 |
| | 3 | 140 | 14.2 | 5.6 |
| Adult ell | 4 | 192 | 11.4 | 1.5 |
| | 5 | 200 | 12.4 | 0.9 |
| | 6 | 205 | 12.8 | 2.8 |

On the basis of the above finding, the present inventors discovered that the hormone content in the secretory tissue of eel is temporarily increased at a certain stage of growth in case the eel is bred in sea water or an aqueous common salt solution similar in composition thereto, and that a serum calcium reducing hormone high in potency per unit of the secretory tissue may be recovered by using a raw material for extraction of the secretory tissue of eel at said stage of growth.

Figure 2:
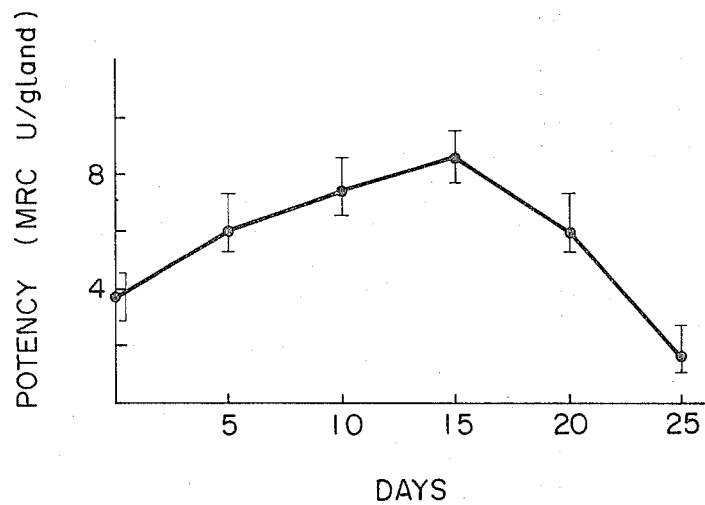
Figure 3:
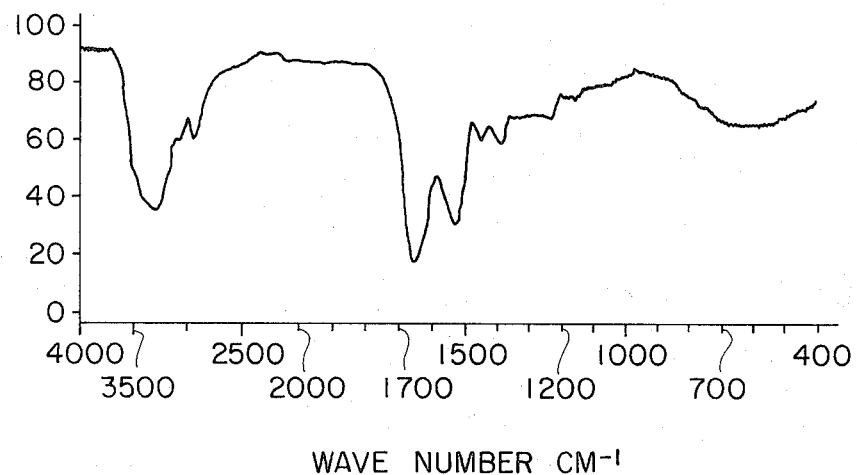
Figure 4:
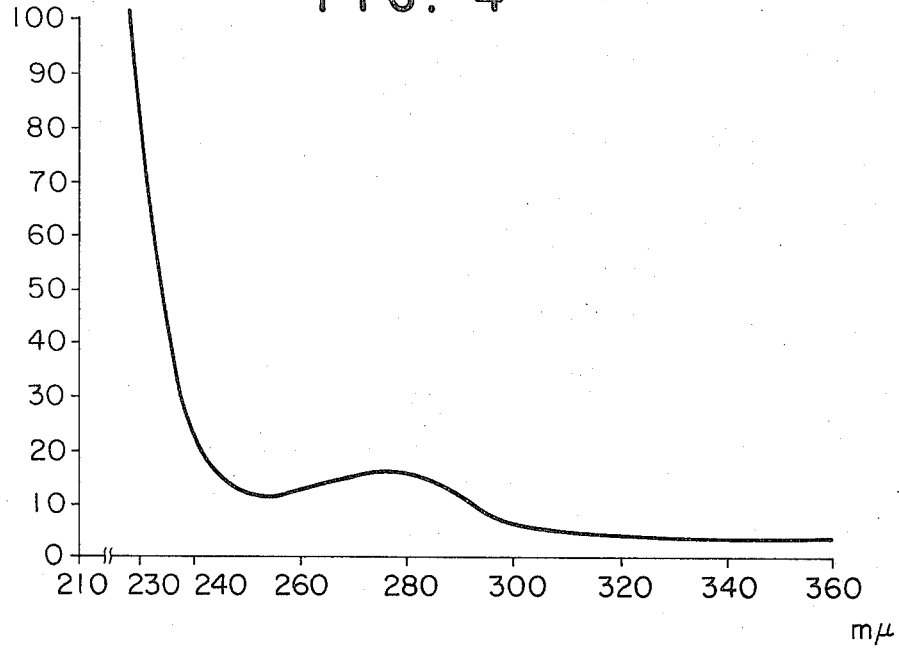

In the accompanying drawings, FIG. 1 is a graph showing the relation between the breeding time (days) of eel in sea water diluted to one half the concentration, serum calcium value and osmotic pressure of the serum; FIG. 2 is a graph showing the relation between the breeding time (days) of eel in sea water diluted to one half the concentration and potency of serum calcium reducing action per unit of the secretory tissue; FIGS. 3–4 are graphs showing respectively IR (KBr method) and U.V. spectra of the present sample (sample 199 γ/ml., $\lambda_{max.}^{H2O}$=277 m$\mu$ $E_{1cm}^{1\%}$ cm=8.04)

having 70 MRC U/mg.; FIG. 5 is a graph showing the active fractions of the substance obtained by the treatment with Sephadex G-75 (Example 8).

The substances obtained according to the present invention are polypeptides closely analogous to thyrocalcitonin so long as they are those capable of reducing calcium value in the serum of mammals.

The present substances as obtained are in the form of a white powder, and have physicochemical properties as set forth below.

(1) Solubility in solvent: Soluble in water but insoluble in such non-polar organic solvents as benzene, hexane and carbon tetrachloride.

(2) Molecular weight 4500.

<Method of determination>

Cobalamin (m.w.: 1355), Glucagon (m.w.: 3485), Porcine thyrocalcitonin (m.w.: 3600) and Cytochrome C (m.w.: 12750) are taken as standard substances. The molecular weights of the present substances are calculated from the relative ratios based on eluted positions of the present effective substances to the standard substances as obtained respectively by effecting gel filtrations thereof with Sephadex G-50.

(3) Color reaction: Positive to ninhydrin reaction, Sakaguchi's reaction, diazo reaction and to Rydon-Smith reaction.

(4) Deactivated by the function of such proteolytic enzymes as "Subtilopeptidase A" and "Chymotrypsin."

<Deactivation conditions>

Reacted with the enzyme in an amount of 1/50 (by weight) of the present substance in a 0.01 M phosphate buffer solution (pH 6.8) at 37° C. for 2 hours.

(5) Amino acid composition: 150γ of a sample (123 MRC U/mg.) hydrolyzed with 6 N hydrochloric acid at 110° C. for 24 hrs.

| Amino acid | μMol | Amino acid | μMol |
|---|---|---|---|
| Lysine | 0.0636 | Glycine | 0.0846 |
| Histidine | 0.0041 | Alanine | 0.0760 |
| $NH_3$ | 0.0816 | Half cystine | (–) |
| Arginine | 0.0256 | Valine | 0.0807 |
| Aspartic acid | 0.0638 | Methionine | (–) |
| Threonine | 0.0229 | Isoleucine | 0.0312 |
| Serine | 0.0384 | Leucine | 0.0641 |
| Glutamic acid | 0.0792 | Tyrosine | 0.0052 |
| Proline | 0.0207 | Phenylalanine | 0.0192 |

(6) Disc electrophoretic properties.

| Sample | A (100γ) | B (50γ) | C (150γ) | D (150γ) | E (150γ) |
|---|---|---|---|---|---|
| Phoresis conditions | 3 ma., 60 min | 8 ma., 435 min | 6 ma., 80 min | 6 ma., 40 min | 6 ma., 40 min |
| Gel | Standard gel (pH 8.9–9.0) | Acidic gel incorporated with 6 M urea (pH 4.4) | Acidic gel incorporated with 6 M urea (pH 4.4) | Acidic gel incorporated with 6 M urea (pH 4.4) | Acidic gel incorporated with 6 M urea (pH 4.4) |
| Developing solution | Tris glycine buffer solution (pH 8.6) | Sodium acetate buffer solution (pH 4.7) | β-Alanine acetic acid buffer solution (pH 5.0) | β-Alanine acetic acid buffer solution (pH 5.0) | β-Alanine acetic acid buffer solution (pH 5.0) |
| Color | Ponceaux red | Amido black | Ponceaux red | Ponceaux red | Ponceaux red |
| Development value | 0 (origin) | $R_{M.G.}$=0.4–0.45 | $R_{M.G.}$=0.5 | $R_{M.G.}$=0.5 | $R_{M.G.}$=0.5 |

NOTE.—M.G.=Methyl green; "development value" means a ratio of a distance Hoved for a sample to that for methyl green.

(7) When test animals (male rats) are administrated with the present substance, reduction in values of phosphorus and magnesium are observed, in addition to the calcium reduction in blood.

(8) Specific rotation: $[\alpha]_D^{25}$=—20° (C=0.4%, $H_2O$) (123 MRC U/mg. sample).

(9) Thin layer chromatographic properties: *Sample* (61 MRC U/mg.).

Development solvent:

n-Butanol 15; Pyridine 10; Water 12; Acetic acid 3.

Carrier: Abisel (Trade Name) (Asahi Kasei Kogyo Kabushiki Kaisha).

Developer: Rydon Smith Reagent.

Development value: $R_f$=0.46—0.71.

Process for Extraction of the Present Substance

1. Raw material (a) A portion of the blood vessel of vena cava attached to oesophagus near the heart of eel.

More particularly, preferable as the portion to be taken out is the portion of oesophagus cut into an adequate length before and behind the heart, for example, a length of about 2 cm. each in both directions of the heart. The tissue thus taken out may be used either as it is or in the form of a defatted and dried product. The defatted and dried product may be prepared according to known procedure employed in the treatment of viscera of animals. In view of elimination of trace amounts of metal ions including $Ca^{++}$, it is desirable in said treatment to use acetone containing a microscopical amount of EDTA [ethylene diamine tetraacetic acid]. For example, the aforesaid tissue of eel is dehydrated by dipping it in a microscopical amount of EDTA containing acetone for a few days and then defatted with chloroform. The resulting product is again dipped in acetone for a few days and then air-dried to obtain a dried product.

(b) As the raw material for extraction, heart, particularly pericardial membrane of eel may be used, as it is, without being subjected to any further treatments. It is preferable to use the same in the form of a dried product. The procedures for obtaining the dried product are the same as mentioned in (a).

DISTRIBUTION OF EFFECTIVE TISSUES IN EEL

| Tissue | Weight (mg.) | MRC U/tissue | MRC mU/tissue (mg.) | MRC mU/protein N (γ) |
|---|---|---|---|---|
| (a) Tissue containing vena cava attached to oesophagus | 170.3 | 1.6 | 9.4 | 5.9 |
| (b) Pericardial membrane | 107.7 | 6.6 | 61.5 | 26.5 |
| (a) plus (b) | 239.6 | 9.6 | 40.1 | 38.7 |

Calcium reducing activity of a serum calcium reducing hormone-like substance obtained from one eel, i.e. a value of calcitonin activity obtained according to the determination method as set forth hereinafter was compared, in terms of the body weight of 1 kg., with those of other animals in their secretory tissues disclosed in a literature, D. H. Copp, C. O. Parkis: "Parathyroid Hormone and Thyrocalcitonin (Calcitonin)" Amsterdam Excerpta Medica Foundation, p. *78* (1968). The results obtained are as shown in the following table.

It is understood from said table that in case of the eel, the effective activity of serum calcium reducing hormone-like substance extracted from a secretory tissue of one eel is very high when converted into a value per 1 kg., of the body weight. For example, it may be appreciated therefrom that for obtaining according to the present invention an effective substance having a calcitonin activity corresponding to thyrocalcitonin recovered from thyroid gland of one hog, about 2–4 eels suffice for this purpose.

|  | Secretory tissue | mU/tissue | mU/body weight (1 kg.) |
|---|---|---|---|
| Rat | Thyroid gland | 100–300 | 200–800 |
| Hog | do | 20,000–40,000 | 250–500 |
| Dog | do | 5,000–20,000 | 400–800 |
| Domestic fowl | Ultimobranchial gland | 200–700 | 500–800 |
| Turkey | do | 2,200 | 450–900 |
| Swanee River cooter | do | 4–10 | 3–9 |
| Midwest bullfrog | do | 0.4 | 1–2 |
| Chum salmon | do | 1,000–1,500 | 160–200 |
| Dogfish shark | do | 500–1,000 | 250–500 |
| Eel | Pericardial membrane and tissue comprising vena cava attached to oesophagus near the heart. | 9,550 | 39,750 |

Determination of serum calcium reducing activity of a serum calcium reducing hormone-like substance extracted from a secretory tissue of eel was conducted according to such method as mentioned below.

An extract obtained by extracting a tissue comprising a secretory organ of eel, in which a serum calcium reducing hormone-like substance is present, with 0.2 N hydrochloric acid is neutralized with sodium hydroxide. The extract is diluted with a 0.1 N sodium acetate-0.1% albumin solution to 2, 4, 6, 8, 10 and 20 times. Male rats are subjected individually to intramuscular injection with each 0.5 ml. of the dilutions. After one hour, all the rats are killed to obtain their respective bloods, and serum calcium value of each blood is determined according to atomic absorption spectrophotomery method. On the other hand, Research Standard (a product having 8 MRC U/mg. produced by Armour Pharm. Co.), which is an extract obtained from thyroid gland of hog, is diluted so as to give dilutions of 30, 60, 90, 150, 180 and 240 MRC mU/0.5 ml. respectively. Male rats are subjected to intramuscular injection with each 0.5 ml. of the dilutions. Following the same procedure as above, serum calcium value of male rats is determined. From the potency of the corresponding Research Standard, a potency of a serum calcium reducing hormone-like substance in the aforesaid eel extract is determined.

Eels are preferably bred previously in sea water or saline water similar in composition thereto. For example, there may be used sea water, artificial sea water or saline water. Generally, eels are capable of living in both sea water and fresh water. However, eels seized from fresh water are in danger of being killed when they are left to stand directly in sea water or saline water similar in composition to that of sea water. It is preferable, therefore, to dilute sea water or control a concentration of sodium chloride in saline water, so that eels to be bred therein may not be killed. Accordingly, breeding of eels is suitably carried out in saline water having a common salt concentration equivalent to about ⅓–⅔ of that of sea water.

Thus, a potency of calcitonin activity per the secretory tissue is temporarily increased when eels are bred in sea water or saline water similar in composition thereto. That is, the relation between the breeding time (days) of eel bred in sea water diluted to one half time, serum calcium value and osmotic pressure of the serum is as shown in FIG. 1. Both the serum calcium value and the osmotic pressure continue to increase till up to around the 5th day after the start of the breeding, and thereafter they begin to fall. As shown in FIG. 2, the potency of the effective substance per unit of the secretory tissue reaches, at a lower pace than that of the serum calcium value or osmotic pressure, the maximum value on the 10-15th day after the initiation of the breeding, and thereafter the potency begins to fall.

Accordingly, it is desirable to continue breeding until the content of said harmone-like substance reaches the maximum value, and then enucleate a secretory tissue from eel body. The breeding time is preferably about 10-17 days, though there is an individual difference among eels. Tissue comprising vena cava attached to oesophagus near the heart, and pericardial membrane were enucleated from eels, which had been bred in sea water or saline water, and which had not been bred, and were subjected to determination of the potency thereof per units of the secretory tissue, body weight and protein nitrogen. The results were as shown in the following table. It is understood from said table that in every case the potency is increased by 2-3 times as a result of the breeding of eels in sea water or an aqueous common salt solution similar thereto.

| | MRC U/tissue | MRC mU/mg. | MRC mU/ protein N (γ) (Folin method) |
|---|---|---|---|
| Fresh water | 2.2-4.1 | 8.0-29.8 | 1.6-5.2 |
| ½ sea water | 6.6-9.2 | 29.7-53.0 | 7.6-11.5 |
| ⅓ sea water | 5.8-9.0 | 30.1-51.2 | 8.1-12.3 |

NOTE.—Breeding time: 13 days.

However, since the extract liquid contains various contaminating proteins, the liquid is desirably purified further by suitably removing said proteins therefrom. A technique for removal of said proteins may be applied directly to the aforesaid extract to precipitate the protein, thereby removing the precipitated proteins simultaneously with other solids present in said extract. Alternatively, the technique may be applied to an extract liquid obtained by removing said solids from the said extract. In addition thereto, the aforesaid crude powder may be subjected to purification using this technique.

An ordinary procedure commonly employed in separation and purification of protein can be adopted therefor [for example, Baghdiantz, A. et al.: "Nature" *203*, 1027 ('64); Tenenhouse, A. et al.: "Proc. N. A. S." *53*, 818 ('65); Gudmundsson et al.: "Proc. Roy. Soc." *164*, 460 ('66); Stuart D. Tauber: "Proc. N. A. S." *58*, 1084 ('67) and R. K. O'Dor et al.: "Comp. Biochem. Physiol." *29*, 295 ('69)].

2. Extraction

The above-mentioned raw materials are first subjected to extraction treatment.

Extraction solvents used herein are water, and such dilute organic or mineral acid as hydrochloric acid, acetic acid, oxalic acid, formic acid, phosphoric acid, sulfuric acid, etc. There may also be used solvent mixtures of water, such hydrophilic organic solvents as lower $C_1$-$C_4$ alcohols, acetone, phenol, dioxane, pyridine tetrahydrofuran, methyl cellosolve, dimethylformamide, dimethylsulfoxide, etc. and the organic or mineral acid mentioned above. Examples of mixtures of water, hydrophilic organic solvents and acids are water-butanol-acetic acid, water-butanol-pyridine-acetic acid, and water-butanol-dioxane-acetic acid. There is not critical limitation among the components, as long as the mixtures from a homogeneous solution. Generally, however, the hydrophilic organic solvent is used in an amount of about 25-85% by volume.

In these hydrous solvents, no limitation is particularly required, so far as the water content is concerned. The extraction solvent preferably contains such amount of urea as 4 to 8 moles per liter, particularly when the solvent is water or an aqueous solution of the acids. Furthermore, it is preferable that such reducing agents as cysteine or vitamin C are added to said extraction solvents with the object of preventing oxidation at the time of extraction. As a preferably typical case, there may be mentioned a solvent mixture comprising 8 M urea, 0.1 N cysteine and 0.2 N hydrochloric acid.

In practicing the extraction, it is sufficient that a raw material is dipped at ordinary temperature in the aforesaid extraction solvent with stirring.

3. Purification

An extract liquid obtained by separating and removing solids, which are the tissue fragments of the raw material, from the extract thus obtained is concentrated under reduced pressure and freeze-dried to obtain a crude powder.

These extract liquid contains various inactive, irrelevant proteins, so that it had better be purified. Any procedures for purification of thyrocalcitonin obtained from thyroid gland of mammals can be applied to this effect. One of the procedures is that an extract liquid from which solids have been removed is treated with a small amount of hydrophilic organic solvents such as alcohols having 1 to 4 carbon atoms, acetone, dioxane, pyridine, tetrahydrofuran, methyl cellulose, dimethylformamide, dimethyl sulfoxide, etc., in order to precipitate and remove irrelevant proteins. A large amount of the hydrophilic organic solvents is added to the filtrate thus obtained to precipitate the desired active substance. Another procedure is a pH method where pH is controlled to 6.5 to precipitate irrelevant protein, in place of the addition of a small amount of hydrophilic organic solvents mentioned above.

The thus obtained desired product may further be purified by gel-filtration, ion exchange resins (cation type), chromatography using proper absorbing agents, or the like.

Since a liquid obtained by removing the aforesaid various contaminating proteins contains salts, the liquid is usually subjected to desalting treatment using ion-exchange (anion type) resins or according to other conventional procedures.

The present invention is illustrated with reference to examples set forth below.

Example 1

505 g. of tissue comprising vena cava attached to oesophagus near the heart, which had been gathered from about 2000 eels (*Anguilla japonica*), was dehydrated 3 times by repeating a step of dipping said tissue in 3 l. of acetone containing 90 mg. of EDTA at 5° C. for 5 hours. Dipping the dehydrated tissue in 2 l. of chloroform at 5° C. for 2 hours was repeated 3 times. The same dehydrating step as above but using 2 l. of acetone was repeated 3 times. The resulting precipitate was air-dried to obtain 110 g. of a desired product.

110 g. of the dried product thus obtained was subjected to extraction, wherein said product was dipped at ordinary temperature in 1 l. of a 0.2 N hydrochloric acid containing 480 g. of urea and 17.5 g. of cystine and stirred for 2 hours. To the extract liquid was added 2 l. of a solvent mixture of acetone and acetic acid (1:1), and further was added a mixed liquid comprising 28 ml. of 1 M saline water and 3 l. of acetone. Contaminant protein precipitated was centrifuged off (9000 r.p.m., 15 min.). To the supernatant clear liquid was added 5 l. of ether free from hydrogen peroxide, and the mixture was thoroughly stirred, thereby to precipitate a lower molecular weight protein composed mainly of a desired effective substance. Only the precipitate is recovered by centrifugal separation (9000 r.p.m., 15 min.). This precipitate was washed twice with 400 ml. of a solvent mixture of ether and acetone (1:1) and then dissolved in 1 l. of a 20% acetic acid containing 1.75 g. of cystine. To the solution was added 50 g. of common salt so that the ultimate concentration becomes 5%. The solution was thoroughly stirred to produce precipitate. The precipitate was centrifuged off (9000 r.p.m., 15 min.).

To the supernatant clear liquid was added 170 ml. of 45% trichloroacetic acid to make the ultimate concentration of 7.5%, whereby a desired effective substance began to precipitate. The precipitate was recovered by centrifugal separation (9000 r.p.m., 15 min.), and then the precipitate gathered was washed with 200 ml. of ether and dissolved in 500 ml. of 0.02 N hydrochloric acid.

The hydrochloric acid solution containing the desired effective substance was passed through a column (2 cm. x 30 cm.) packed with Amberlite IRA 400 type ion-exchange resin at a flow rate of 150 ml./hr., thereby absorbing various salts contained in the solution onto said ion-exchange resin. Finally, 50 ml. of distilled water was passed through the column to obtain a desalted eluate containing the desired effective substance. This eluate is concentrated and freeze-dried to obtain 800 mg. of a crude powder of serum calcium reducing hormone-like substance.

Example 2

1.0 g. of a crude powder (6.5 MRC U/mg.) of serum calcium reducing hormone-like substance, which had been obtained according to the procedure as set forth in Example 1, was dispersed in 100 ml. of a solvent mixture of butanol, acetic acid and water (60:15:25), and extraction was effected with stirring at 4° C. for 1 hour. Thereafter, 30 ml. of butanol, 110 ml. of water and 3.75 ml. of pyridine were added to the exraction mixture, and the resulting mixture was stirred and then allowed to stand, whereby the solution was divided into two layers. A butanolic upper layer, in which most of a desired effective substance is present, was separated from a lower layer. To the lower layer was added 100 ml. of an upper layer of a solvent mixture of butanol, acetic acid, water and pyridine (6:1:9:0.25), and the mixture was allowed to stand after stirring. A butanolic upper layer was separated therefrom. A lower layer was treated 3 times by repeating the same operation as above. The upper layers thus separated were combined together, and the combined layer was concentrated under reduced pressure. The concentrated product was washed with ether and then dissolved in 25 ml. of water. The solution was freeze-dried to obtain 105 mg. of a desired effective powder.

Subsequently, 105 mg. of the powder thus obtained was dissolved in 5 ml. of a 0.2 M ammonium acetate solution (pH 4.7). The solution was passed through a column (2.0 cm. x 80 cm.) packed with Sephadex G-75 and buffered with a 0.2 M ammonium acetate solution (pH 4.7), and eluted at a rate of 12 ml./hr. with said buffer solution used as an eluant. The resulting eluate was collected in fraction of each 4 ml. Biological activity of each fraction on rat was determined, with the result that a desired effective substance has come to be eluted in fractions Nos. 65–85. Therefore, these fractions were gathered, and the gathered fraction was concentrated under reduced pressure and freeze-dried to obtain 24 mg. (98 MRC U/mg.) of a desired effective powder.

Example 3

120 g. of pericardial membrane obtained by removing myocardium portions from hearts gathered from about 1000 eels (Anguilla rostrata) was dehydrated by dipping said pericardial membrane at 5° C. for 5 hours in 1 l. of acetone containing 20 mg. of EDTA. This dehydration treatment was repeated 3 times. Thereafter, the dehydrated product was defatted by dipping the same in 800 ml. of chloroform at 5° C. for 2 hours. This defatting treatment was repeated twice. The defatted product was further dehydrated under the same conditions as above but using 1 l. of acetone, and this dehydrating treatment was repeated 3 times. The dehydrated product was air dried to obtain 36 g. of a dried product.

36 g. of the dried product thus obtained was extracted with stirring for 3 hours at ordinary temperature in 1.2 l. of a 0.2 N hydrochloric acid containing 500 g. of urea and 18.0 g. of cysteine. The mixture was centrifugalized (9000 r.p.m., for 15 min.) to separate solid therefrom. The separated solid was washed with 500 ml. of the aforesaid extraction solvent, and the washings was combined with the extract liquid from which the solid was removed by the centrifugal separation effected previously.

1.7 l. of the extract liquid thus obtained was charged with 250 ml. of a 45% trichloroacetic acid, and then the resulting precipitate was separated by centrifugal separation (9000 r.p.m., 15 min.). The precipitate was dispersed in 50 ml. of water, and insolubles were removed by centrifugal separation (5000 r.p.m., 10 min.). The supernatant liquid obtained was freeze-dried to obtain 450 mg. (1.8 MRC U/mg.) of a crude hormone-like effective substance.

Example 4

From about 3000 eels (*Anguilla japonica*), tissue comprising vena cava attached to oesophagus near heart and pericardial membrane were enucleated. The raw material thus obtained was subjected to the same defatting and dehydrating treatments as in Example 3 to obtain 225 g. of a dried powder.

225 g. of this powder was extracted with stirring for 2 hours at ordinary temperature in 2 l. of a 0.2 N hydrochloric acid containing 960 g. of urea and 35 g. of cysteine. Thereafter, the extract liquid was charged with 4 l. of a solvent mixture of acetone and acetic acid (1:1) and further charged with 6 l. of a mixed liquid of 56 ml. of 1 M saline water and 6 l. of acetone, and the mixture was thoroughly stirred. The precipitated contaminating proteins were removed by centrifugal separation (9000 r.p.m., 15 min.). The resulting supernatant liquid was charged with 10 l. of ether free of peroxide, and the mixture was thoroughly stirred, whereby a precipitate of a low molecular weight protein composed of a desired effective substance was obtained. The precipitate was collected by centrifugal separation (9000 r.p.m., 15 min.). The collected precipitate was washed twice with 500 ml. of a solvent mixture of ether and acetone (1:1) and then freeze-dried to obtain 17.8 g. (1.0 MRC U/mg.) of a crude powder of a desired effective substance.

Example 5

700 mg. of the crude powder of the desired product obtained in Example 4 was homogenized with 80 ml. of a solvent mixture of butanol, acetic acid and water (12:3:5), and extraction was effected with stirring for 2 hours. Thereafter, to a supernatant liquid, from which insolubles were removed by centrifugal separation (3000 r.p.m., 10 min.), were added 24 ml. of butanol, 28 ml. of water and 3 ml. of pyridine, and the mixture was stirred and then allowed to stand, whereby the solution was divided into two layers. A butanolic upper layer, in which most of a desired effective substance is present, was separated therefrom. To a lower layer was added 80 ml. of an upper layer of a solvent mixture of butanol, acetic acid, water and pyridine (6:1:9:0.25), and the mixture was stirred and then allowed to stand. A substantially butanolic layer was separated therefrom. This lower layer was further treated 3 times in the same manner as above. The upper layers thus obtained were combined together and concentrated under reduced pressure. This concentration residue was washed with ether and then dissolved in 4 ml. of a 0.2 M ammonium acetate solution (pH 4.7). The solution was passed through a column (2.0 cm. x 80 cm.) packed with Sephadex G-75 and buffered with a 0.2 M ammonium acetate solution (pH 4.7), and eluted at a rate of 12 ml./hr. using the aforesaid buffer solution as an eluant. The resulting eluate was collected in fraction of 4 ml. each. Biological activity of each fraction obtained was determined on rat, with the result that a desired effective substance has come to be eluted in fraction Nos. 63–82. Therefore, these fractions were gathered and concentrated under reduced pressure and then freeze-dried to obtain 2.1 mg. (24 MRC U/mg.) of a powder of a desired effective substance.

Example 6

From about 3000 eels (*Anguilla japonica*), 350 g. of pericardial membrane was obtained by removing myocardium portions therefrom. The same defatting and dehydrating treatments as set forth in Example 3 were effected to obtain 105 g. of a dried product of endocardium. 105 g. of the dried product thus obtained was subjected to treatments in the same manner as in Example 1, except that a precipitate obtained after treatment with trichloroacetic acid was subjected to centrifugal separation (9000 r.p.m., 15 min.) to obtain 700 mg. of a precipitate. This precipitate was washed with 100 ml. of ether and then dissolved in 28 ml. of water, and, after removing insolubles by centrifugal separation (5000 r.p.m., 10 min.), freeze-dried to obtain 350 mg. (8 MRC U/mg.) of a crude powder of hormone-like effective substance.

Example 7

350 mg. of the crude powder obtained in Example 6 was dissolved in 3 ml. of a 0.2 M ammonium acetate solution (pH 4.7). The solution was passed through a column (3.0 cm. x 100 cm.) packed with Sephadex G-75 and eluted at a rate of 9 ml./hr. with the 0.2 M ammonium acetate solution (pH 4.7) used as an eluant. The resulting eluate was collected in fraction of 8 ml. each. Biological activity of each fraction obtained was determined, with the result that a serum calcium reducing hormone-like effective substance has come to be eluted into fractions Nos. 50–60. Therefore, these fractions were gathered. The gathered fraction was concentrated under reduced pressure and freeze dried to obtain 45 mg. of a crude powder.

Subsequently, 45 mg. of the powder was dissolved in 1 ml. of a 0.01 M ammonium formate solution (pH 4.37). The solution was passed through a column (1.0 cm. x 5.0 cm.) packed with carboxymethyl cellulose (CMC), and eluted at a rate of 4.5 ml./hr. stepwise using 70 ml. of a 0.01 M ammonium formate solution (pH 4.37), 60 ml. of a 0.01–0.2 M ammonium formate solution (linear gradient), 30 ml. of 0.2 M ammonium formate solution, and 40 ml. of 2.0 M ammonium formate solution. The resulting eluate was collected in fraction of 2 ml. each. Fractions Nos. 50–65, in which calcitonin effective substance has come to be eluted, as confirmed according to determination of biological activity on each fraction, were gathered. The gathered fraction was concentrated under reduced pressure and then freeze-dried to obtain 22 mg. (220 MRC U/mg.) of a powder of hormone-like effective substance.

Example 8

Pericardial membrane and a tissue comprising vena cava attached to oesophagus near the heart, which had been gathered from about 2,500 eels (*Anguilla japonica*), were subjected to the defatting and dehydrating treatment in the same manner as in Example 3 to obtain 200 g. of dried product (100 MRC mU/mg.). 200 g. of the thus obtained dried product was dispersed in a solvent mixture comprising 3.36 l. of butanol, 1.92 l. of pyridine, 320 ml. of acetic acid and 2.40 l. of water in order to effect extraction under stirring at 50° C. for 24 hours. The thus treated mixture was filtered with gauze and filter paper to obtain a filtrate. This filtrate was concentrated under reduced pressure at 50° C. The thus concentrated residue was dissolved in 400 ml. of water and centrifuged (5000 r.p.m., 10 min.) to remove the insolubles. The supernatant clear liquid was freeze-dried to obtain 5.2 g. of powder containing the desired effective substance (6.2 MRC U/mg.).

The thus obtained 5.2 g. of the desired effective substance-containing powder was dissolved in 150 ml. of a 0.2 N ammonium acetate solution (pH 4.7), and passed through a column (7.5 cm. x 90 cm.) packed with Sephadex G-75 and buffered with the same ammonium acetate solution as above. The column was eluted with the said ammonium acetate solution at a rate of 127.5 ml./hr. The resulting eluate was collected in fractions of 15 ml. each.

With respect to each fraction thus obtained, the biological activity to rats was measured. Fraction Nos. 205 to 225, which were high in serum calcium-reducing activity, were gathered and freeze-dried to obtain 95 mg. of serum calcium-reducing hormone-like substance (105 MRC U/mg.).

Example 9

Pericardial membrane and a tissue comprising vena cava attached to oesophagus near the heart, which had been gathered from about 15,000 eels (*Anguilla japonica*) were defatted and dehydrated according to the same procedure as Example 3 to obtain 1.2 kg. of dried powder (100 MRC mU/mg.). The powder (1.2 kg.) was dispersed in a solvent mixture (12 l.) of butanol-acetic acid-water (15:3:6 by vol.) to effect extraction at 50° C. for 24 hours under stirring. Insoluble material was centrifugalized (3000 r.p.m., 10 min.) and the supernatant (about 9 l.) was concentrated to dryness at 50° C. The product thus obtained was washed three times with 1.5 l. each of acetone and two times with 1 l. each of chloroform, and then it was dried in a desiccator to obtain powder (40 g.). The powder was dispersed in a 0.2 N HCl solution (1.5 l.), and the precipitate thus formed was centrifugalized (5000 r.p.m., 10 min.) to obtain supernatant (1.3 l.). 100 ml. of the supernatant was passed through a column (7.5 cm. $\phi$ x 90 cm.) packed with Sephadex G-75 and buffered with a 0.1 M formic acid solution (pH 4.7). The column was eluted with the 0.1 M formic acid solution at a rate of 180 ml./hr. The elute was collected in fractions (20 ml. each).

The fraction each was bio-assayed (rats) to obtain an active fraction (600 ml.). The fraction was further ultrafiltered by means of Diaflo type UM-2 (Amicon Corp.). The residual liquor was freeze-dried to obtain powdery serum calcium reducing hormone-like substance (51 mg., 98 MRC U/mg.).

Example 10

200 Eels (*Anguilla japonica*) were bred at 20° C. for 12 days in an artificial sea water having a ½ sea water concentration (Vant Hoff's artificial sea water). Thereafter, from the eels thus bred, tissues comprising vena cava attached to oesophagus near heart, and endocardiums were enucleated. The enucleated raw material was subjected twice to dehydration step wherein the material was dipped at 5° C. for 3 hours in 400 ml. of acetone containing 10 mg. of EDTA. Thereafter, the dehydrated product was subjected twice to defatting step wherein the product was dipped at 5° C. for 1 hour in 300 ml. of chloroform. Further, the dehydration step was repeated 2 times under the same conditions as above but using 300 ml. of acetone. The dehydrated product was air dried to obtain 14 g. (potency: 235 MRC U/g.) of a dried product.

Example 11

800 Eels (*Anguilla japonica*) were bred at 20° C. for 13 days in a ⅓ M aqueous common salt solution. Immediately thereafter, tissues comprising vena cava attached to oesophagus near heart, and endocardiums were enucleated from the bred eels. The enucleated raw material was treated in the same manner as described in Example 10 to obtain 68 g. (potency: 208 MRC U/g.) of a dried product.

Example 12

50 g. of the dried product obtained in Example 11 was treated in the same procedure as in Example 6 to obtain 365 mg. (potency: 21.5 MRC U/mg.) a powder of a hormone-like effective substance.

Example 13

250 mg. of the powder obtained in Example 12 was treated in the same manner as in Example 2, except that the eluate was collected in fraction of 8 ml. each in a test tube. Based on the determinations of absorbency at 277 m$\mu$ and biological activity on each fraction, the fractions Nos. 15-20, 36-54 and 55-70 were gathered together, and the gathered fraction was concentrated and then freeze-dried to obtain 79.5 mg. (potency: 81.2 MRC U/mg.) of a hormone powder.

Example 14

100 mg. (potency: 24.8 MRC U/mg.) of a powder obtained in the same procedure as in Example 12 was dissolved in 1 ml. of a 0.01 M ammonium formate solution (pH 4.4). The solution was passed through a column (1.0 cm. x 5.0 cm.) packed with carboxymethyl cellulose and buffered with a 0.01 M ammonium formate solution (pH 4.4), and eluted continuously at a rate of 4.5 ml./hr. using 70 ml. of a 0.01 M ammonium formate solution (pH 4.4), 60 ml. of a 0.01-0.2 M ammonium formate solution (linear gradient), 30 ml. of 0.2 M ammonium formate solution, and 40 ml. of 2.0 M ammonium formate solution. The resulting eluate was collected in fraction of 2 ml. each. Based on the results of determinations on absorbency at 277 m$\mu$ and biological activity of each fraction the fractions Nos. 56-70 were gathered together. The gathered fraction was freeze-dried to obtain 28.5 mg. (potency: 86.4 MRC U/mg.) of a powder of serum calcium reducing hormone.

What we claim is:

1. A process of preparing a hormone-like substance having a significant serum calcium reducing activity in mammals, which comprises extracting said active substance from a raw material selected from the group consisting of pericardial membrane of an eel of genus Anguilla, a tissue comprising vena cava attached to the oesophagus near the heart of an eel of genus Anguilla, defatted dried products thereof and mixtures thereof, with an extracting solvent which is capable of extracting said active substance selected from the group consisting of water, dilute organic acid, dilute mineral acid, homogeneous solution of water, dilute mineral acid and hydrophilic organic solvents, and homogeneous solution of water, dilute organic acid and hydrophilic organic solvents; removing contaminating inactive proteins from the resulting extract by precipitating the inactive proteins from the resulting extract; then further purifying by separating impurities therefrom and drying the solution thus obtained.

2. A process according to claim 1, wherein the extracting solvent is 0.2 N hydrochloric acid containing 4-8 M urea and 0.1 N cysteine.

3. A process according to claim 1, wherein the extracting solvent is a mixture of lower $C_1$-$C_4$ alcohol, acetic acid and water.

4. A process according to claim 1, which comprises removing solids from the extract after extraction of the active substance from the raw material, and adding 0.2 N hydrochloric acid to the resulting supernatant liquid to remove the inactive proteins as solid precipitate, and then drying thus obtained supernatant liquid.

5. A process according to claim 1, wherein said raw material is obtained from said eel having been bred for 10-17 days in sea water or saline water having a common salt concentration equivalent to about ⅓-⅔ of that of sea water.

6. A process according to claim 1, wherein the contaminating inactive proteins are removed by adding a solvent mixture of acetone-acetic acid to the extracting solvent containing the active substance followed by the addition of a mixture of saline water and acetone to the resulting extraction solvent to form a precipitate, separating the supernatant liquid from the precipitate, adding ether to the resulting supernatant liquid to form a precipitate, centrifugalizing the precipitate and then drying the centrifugalized precipitate.

7. A process according to claim 6, wherein the acetone-acetic acid is in the ratio of 1:1 in the solvent mixture, the mixture of saline water and acetone contains 28 ml. of one mole of saline water and 3 liters of acetone, and the ether is free from hydrogen peroxide.

8. A process according to claim 1, wherein the further purification of the hormone-like substance having a significant serum calcium reducing activity in mammals is achieved by column chromatography using a column packed with gels or cation exchange resins to remove impurities.

9. A process according to claim 1, wherein the homogeneous solution contains from 25 to 85% by volume of at least one hydrophilic organic solvent selected from the group consisting of $C_1$-$C_4$ lower alcohols, acetone, phenol, dioxane, pyridine, tetrahydrofuran, methyl cellosolve, dimethyl formamide, and dimethylsulfoxide.

10. A process according to claim 1, wherein said raw material is obtained from an eel of genus *Anguilla japonica*.

11. A process according claim 1, which further comprises removing solids, which are tissue fragments of the raw material, from the resulting extract after the raw material has been extracted with the extract solvent and before the contaminating inactive proteins are removed.

12. A process according to claim 1, wherein the contaminating inactive proteins are removed by controlling the pH to 6.5 to precipitate said contaminating inactive proteins.

13. A process according to claim 1, wherein the raw material is tissue comprising vena cava attached to the oesophagus within about 2 cm. of the heart of the eel of genus Anguilla.

14. A process according to claim 1, wherein the defatted dry products of the raw material are obtained by dipping the raw material selected from the group consisting of pericardial membrane, a tissue comprising vena cava attached to the oesophagus near the heart of the eel of genus Anguilla, and mixtures thereof, into acetone containing a small amount of EDTA for a few days, defatting said dehydrated raw material with chloroform, dipping the defatted material in acetone for a few days and then air-drying to obtain the defatted dry products.

15. A process according to claim 1, wherein the homogeneous solution of water, dilute organic acid and hydrophilic organic solvents is selected from the group consisting of water-butanol-acetic acid, water-butanol-pyridine-acetic acid, and water-butanol-dioxane-acetic acid.

16. A process according to claim 1, wherein the extracting solvent contains a sufficient amount of a reducing agent selected from the group consisting of cysteine and vitamin C to prevent oxidation at the time of extraction.

17. The hormone-like substance having a significant serum calcium reducing activity in mammals produced by the process of claim 1.

References Cited

Foster, J. of Postgrad. Med.—vol. 44 (May 1968), pp. 411, 412, and 417.

SAM ROSEN, Primary Examiner